Patented Aug. 4, 1925.

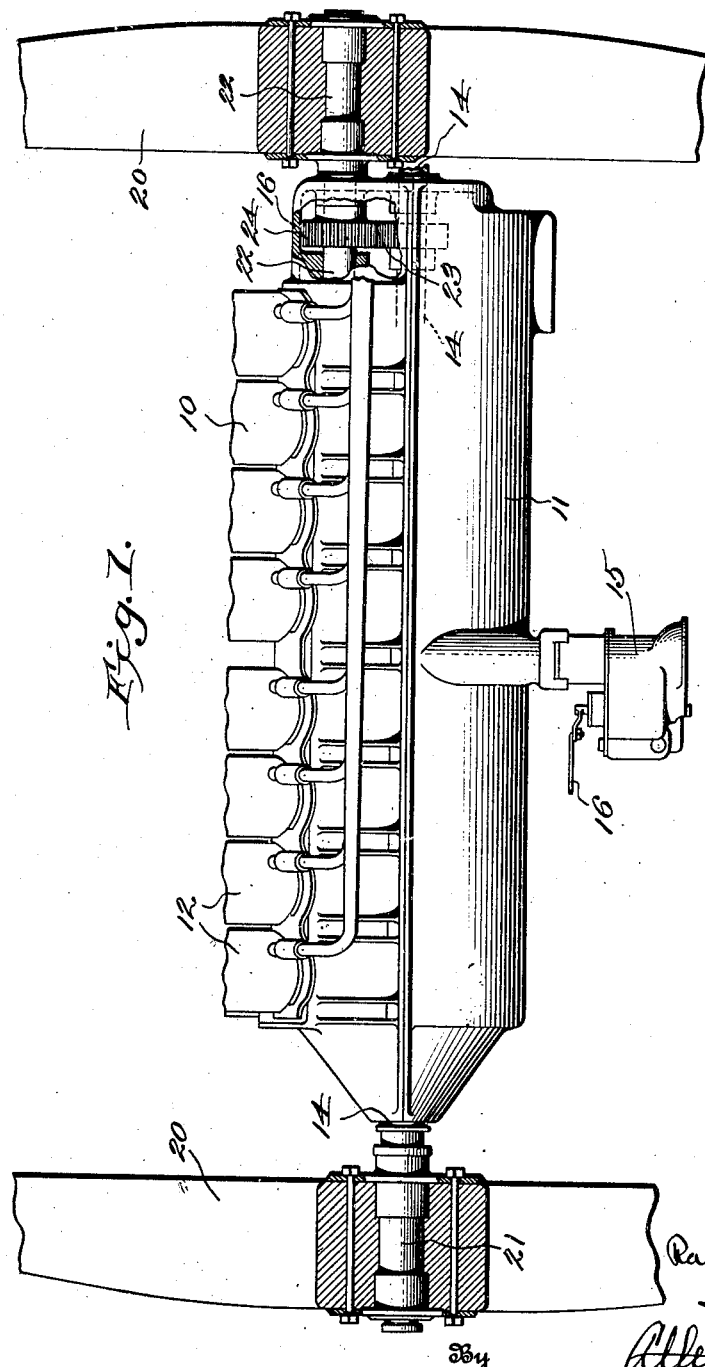

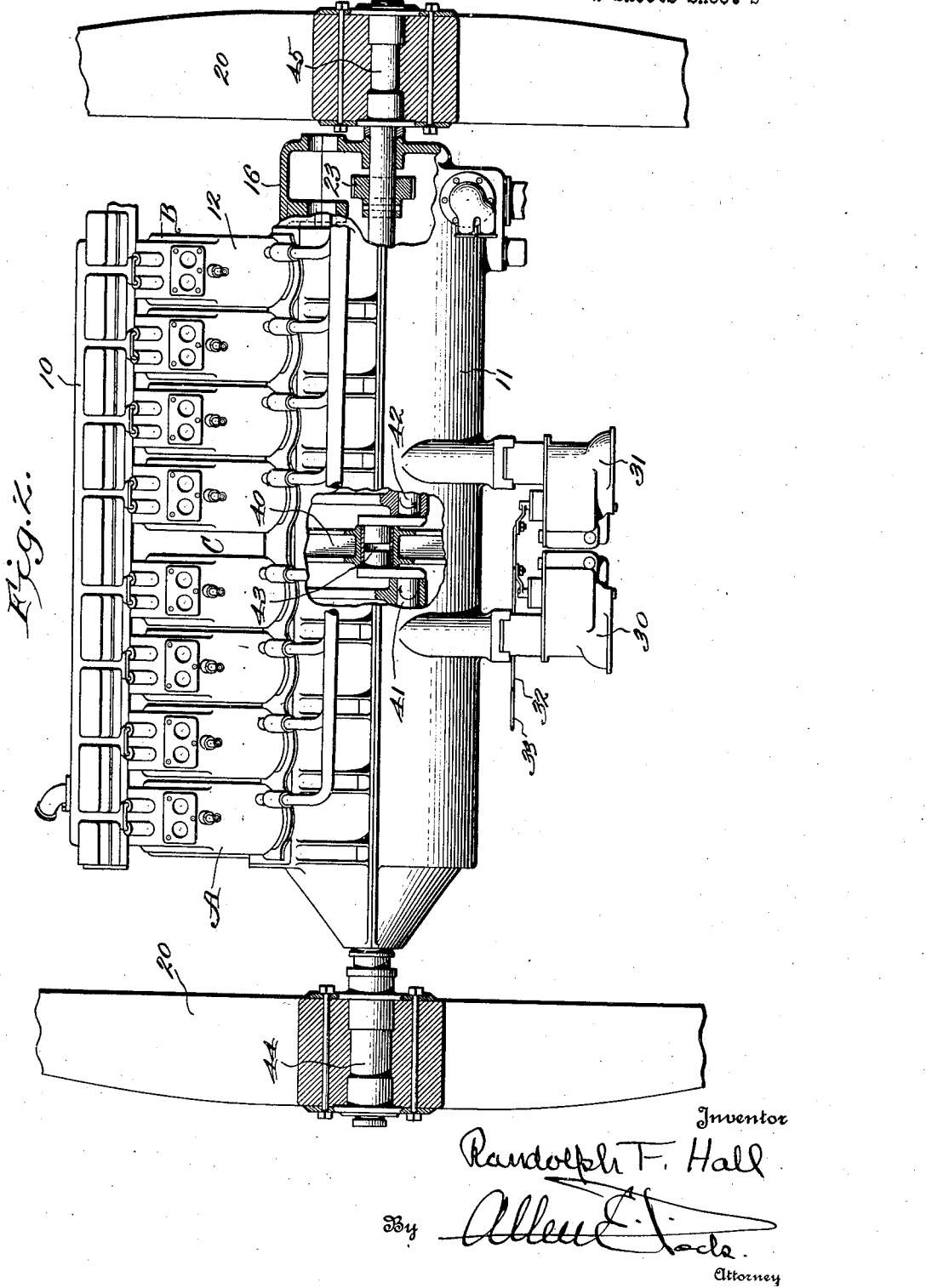

1,548,599

UNITED STATES PATENT OFFICE.

RANDOLPH F. HALL, OF ITHACA, NEW YORK, ASSIGNOR OF ONE-FOURTH TO THEODORE P. HALL, OF WALLINGFORD, CONNECTICUT.

AIRPLANE.

Application filed July 2, 1924. Serial No. 723,709.

*To all whom it may concern:*

Be it known that I, RANDOLPH F. HALL, a citizen of the United States of America, and a resident of Ithaca, county of Tompkins, State of New York, have invented certain new and useful Improvements in Airplanes, of which the following is a specification.

This invention relates to certain improvements in airplanes; and the nature and objects of the invention will be readily recognized and understood by those skilled in the arts involved, in the light of the following explanation and detailed description of the accompanying drawings illustrating what I at present consider to be the preferred embodiments or mechanical expressions of the invention from among various other forms, arrangements, combinations and constructions of which the invention is capable within the spirit and scope thereof.

More particularly the invention relates to power units (power plants or motors and the propellers driven thereby) for aircraft, both of the lighter-than-air and of the airplane or heavier-than-air type, and is specifically directed to the solution of certain problems and the substantial elimination of certain disadvantages encountered in the design, installations, mounting and operation of power units of the relatively large high power types for airplanes.

In aircraft of the large types and particularly with the large types of airplanes requiring relatively high power for the propulsion thereof, the present design tendency and aim is toward concentration and centralization of the required power. This tendency and aim is expressed and carried out in the large types of airplanes by utilizing relatively large and high powered units instead of the average, normal or relatively low powered type of aeronautical power unit, so that the number of power units necessary to develop the required power for operating an airplane of the large type is materially reduced. The reduction to the minimum in the number of power units required permits of a more centralized grouping and mounting of the units on the airplane and a concentration or localizing of the total power at a more efficient location. This centralization or grouping of the power units results in the simplification of the mounting and installation, and further results in an increased efficiency in design due to the gain in accessibility to the units and the material reduction in head or parasite resistance, as well as compactness and a more efficient weight distribution to develop a relatively low inertia value and a corresponding increase in maneuverability of the airplane, all of which will be clear to and readily understood by those skilled in the aeronautical art.

However, with the use of large, high powered types of aircraft power units, in order to absorb the high power of a unit the propeller thereof must be of such large proportions both diametrical and sectional, as to require considerable space for operating clearance with the resulting difficulties in proper mounting and installation of the unit, and further due to the large centrifugal force set up by such a propeller the weight thereof must be likewise large to provide the requisite factor of safety. Also, because of the large torque forces developed, which reach a maximum with a plurality of propellers revolving in the same direction, it is with considerable difficulty and resulting design and structural complications that these forces are counteracted, as for example, by the use in an airplane of variable incidence rigging of the wings to offset or compensate for the torque forces so developed.

Hence, the main and fundamental object of the present invention is to solve the foregoing problems and substantially eliminate the difficulties and disadvantages resulting therefrom and inherent therein, by the provision of a design, arrangement and mounting of a relatively large high powered aircraft power unit in which the principal characteristic thereof resides in the mounting of a plurality of propellers driven and absorbing the power developed by the motor of the unit, with resulting reduction in proportions and weight of each propeller, and the corresponding reduction in propeller operating clearance with accompanying simplification in mounting and installation of the unit and in design of an airplane on which installed, while retaining in the unit the desired large size and high power to permit of attaining the ends sought of minimum number of power units with centralization in mounting and concentration of total power developed thereby.

Another object of the invention is to overcome and substantially eliminate the torque forces developed by the propeller, or propellers revolving in the same direction, of aircraft power units of the relatively large high powered types in particular, by a design and arrangement of a power unit in which a plurality of propellers are mounted on and driven by the motor of the unit to revolve in opposite directions, so that the torque forces of each propeller are counterbalanced by the torque forces of an oppositely revolving propeller.

Another object of the invention is to provide an aircraft power unit with a propeller mounted at each end of the motor of the unit to directly absorb between them the power developed by the motor, and mounted and arranged so as to be revolved in opposite directions to establish a substantially balanced torque and eliminate the necessity of compensating for propeller torque forces when installed on an aircraft.

Another object of the invention is to provide a design and arrangement of relatively large high powered aircraft power unit in which the power developed by the motor of the unit is directly absorbed by two relatively small diameter propellers to secure a minimum operating clearance, and mounted on and revolved in opposite directions by propeller shafts at opposite ends of the motor, so as to produce a balanced torque.

A further object of the invention is to form a power plant or motor of the relatively large high powered type for an aircraft power unit, with a crankshaft constructed in two independent sections rotated in opposite directions by the motor and each crankshaft directly driving a propeller so that the two propellers are revolved in the opposite directions to balance the propeller torque forces.

A further object of the invention is to provide an internal combustion motor of the relatively large high powered type for an aircraft power unit, with a crank shaft formed in two sections independently operated and controlled by the motor and rotatable thereby in opposite directions.

A further object of the invention is to provide an internal combustion motor particularly applicable for use as an aircraft power unit, with a crankshaft formed in two independent sections and the motor formed into two independent units each having a separate control system and driving one of said crank shaft sections so that the two crankshaft sections can be independently operated and revolved in opposite directions.

With the foregoing main objects, and certain other objects and results in view, which other objects and results will be readily recognized and understood by those familiar with the aeronautical art from the following explanation, the invention consists in certain novel features in construction and in arrangements and combinations of elements, as will be more fully referred to and specified hereinafter.

Referring to the accompanying drawings:

Fig. 1, is a view in side elevation of an aircraft power unit embodying features of the invention, the motor of the unit being diagrammatically disclosed and portions thereof broken away to show the arrangement and mounting of propeller shaft and gearing driving the same from one end of the crankshaft.

Fig. 2, is a view in side elevation of another form of the invention showing more or less diagrammatically a motor provided with the crankshaft in two independently operated sections, portions of the motor crankcase being broken away to disclose the mounting and arrangement of the crankshaft sections, and the independent control means for the motor units operating the shaft sections being diagrammatically indicated.

The mechanical expressions of the invention illustrated in the accompanying drawings are embodied in power units of the large, high powered internal combustion motor types particularly adapted for mounting and installation as power units on an airplane of the relatively large type requiring high power for propulsion and operation, although the invention is not confined to embodiment in power units for airplanes, as it is equally applicable to aircraft power units generally where similar conditions and problems are encountered and the results and advantages of the invention may be desired. It is to be understood further, that the illustrated embodiments of the invention are disclosed purely by way of example and not of limitation in order to clearly present and permit of explaining the principles and various features of the invention, as it will be clear and readily apparent to one skilled in this art that the broad principles of the invention can be expressed in other mechanical forms and arrangements than the particular examples shown and described herewith.

An airplane power unit of the large high powered type embodying the principles and certain features of the invention is disclosed in Fig. 1 of the accompanying drawings, and includes the internal combustion motor 10, which may be of the conventional or any other desired or suitable design or type. In the present instance, the motor 10 is more or less diagrammatically disclosed, with parts broken away and other parts not shown, but it is not deemed necessary to illustrate such motor in full as any of the well known types of motors familiar in design and operation to those skilled in the art may be used, and hence only those elements and parts essential to an explanation of the invention are included and shown. The motor 10, in the example selected, is of the relatively large high powered V-type, and includes the usual crank case 11 upon which the cylinder banks 12 are mounted, and in which the crankshaft 14 is mounted and operated in the usual manner. The crankshaft 14 in Fig. 1 is shown in part within the crank case 11 by dotted lines, and extends outwardly through the opposite ends of the crank case in accordance with the conventional design of aircraft motors. The motor 10 is provided with the usual control and operating mechanism, which in the present instance is diagrammatically disclosed by the carbureter 15 and control lever 16 therefor.

In accordance with the principles of the invention, the power developed by the motor 10 is directly absorbed by two relatively small diameter propellers 20 which are mounted at opposite ends of the motor and driven by the crankshaft 14 thereof. One of the propellers is directly mounted upon and fixed to the extended end 21 of the crankshaft 14, in the usual manner, and is revolved in the direction of rotation of the crankshaft. At the opposite end of the motor 10, the crankshaft 14 is terminated or broken at the end of the crankcase, and a propeller shaft 22 is mounted in suitable bearings above the crankshaft within a casing or housing 16 forming a continuation of the crankcase, as will be clear by reference to Fig. 1 of the drawings. The propeller shaft 22 is extended outwardly a distance beyond the end of casing 16 and crank case 11, and the other of the pair of propellers 20 is mounted thereon for rotation therewith.

The propeller shaft 22 is operatively connected with the crankshaft 14, so as to be rotated thereby in a direction opposite the direction of rotation of the crankshaft. In the present instance, a gear 23 is keyed or otherwise fixed on the crankshaft 14 within the crank case 11 and below propeller shaft 22. A gear 24 is keyed or fixed on the propeller shaft 22 within the casing or housing 16 and in mesh with the crankshaft gear 23, so that the propeller shaft 22 is rotated in a direction opposite the crankshaft 14 through the operatively engaged gears 23 and 24 fixed on the crankshaft 14 and propeller shaft 22, respectively. In operation, the crankshaft 14 is rotated by the motor 10 controlled through control lever 16, and the propeller 20 on the extended end 21 of the crankshaft 14 is revolved in the same direction as the crankshaft, while at the opposite end of the motor the crankshaft gear 23 rotates the propeller shaft 22, through gear 24, in the opposite direction and hence revolves the propeller 20 mounted on shaft 22 in a direction opposite that in which the propeller 20 is revolved at the opposite end of the motor.

The foregoing design and arrangement of aircraft power unit embodying the large high powered type of motor 10 and the propellers 20 driven therefrom at opposite ends of the motor, provides for directly absorbing the high power developed by the motor through the pair of propellers, and thus makes it possible to materially reduce the dimensions and weight of each propeller over a single propeller mounted to alone absorb the high power of the motor, as hereinbefore referred to. The use of the reduced or relatively small diameter propellers 20 simplifies the mounting and installation of a unit because of the decreased propeller operating clearance, and the arrangement and mounting of the propellers 20 at opposite ends and along the longitudinal center of the unit so as to be revolved in opposite directions directly from the motor crankshaft eliminates the serious torque forces developed by a single large propeller, or propellers revolving in the same direction, and establishes a balanced or equalized torque in the unit. These various principles and features of the invention make it possible to more efficiently centralize and concentrate the total power required to propel a large airplane or other aircraft requiring large amount of power, by developing the power from a minimum number of large units in which the serious disadvantages present heretofore in such units are eliminated by the invention.

Attention is here directed to the fact that the power unit of the invention is extremely simple and compact in design and construction with a minimum number of additional elements over the conventional and accepted design of power unit, all of which elements can be readily incorporated in the conventional designs without material reconstruction or redesign. While, in the example illustrated in Fig. 1, gearing is utilized to rotate the propeller shaft 22 from crankshaft 14, it will be clear that other mechanism can be used, as well as other gearing arrangements, without stepping beyond the principles of the invention, and it is not intended by the illustrated mechanical expression of this feature to in any way limit the invention to the specific form as shown.

A modified embodiment presenting the principles of the invention is disclosed in Fig. 2 of the drawings, and provides a power unit consisting of motor 10 directly driving the propellers 20 at opposite ends thereof, so as to absorb the power developed by the motor and revolve the propellers in opposite directions to establish the desired balanced torque. In this form of the invention the motor 10 is more or less diagrammatically disclosed to illustrate any desired type of internal combustion motor of the conventional general design, having the crank case 11 with the cylinder banks 12 mounted thereon in the usual manner. However, in accordance with this form of the invention, the cylinder banks 12 operatively mounted on the common or single crank case 11, are formed into groups A and B, longitudinally of the axis of the motor, and are separated in this instance by a space C between the groups, although not so limited. Each of the groups A and B of the motor 10 are provided with separate operating and control means which are disclosed broadly by the diagrammatical illustration of two carbureters 30 and 31 with the control levers 32 and 33, which control and permit of independent operation of the two unit groups of cylinders A and B, respectively. While only the motor unit throttle controls are shown, it is to be understood that the motor units will be provided with all other necessary or desired controls, such as ignition, mixture and starting, of the usual or any other desired types, as well understood in the motor art.

The crank case 11 is divided into two sections by a truss or web structure 40 disposed on the interior thereof beneath the space C between the cylinder groups A and B. Crankshafts 41 and 42 are independently mounted in each section of the crank case 11 beneath the cylinder groups A and B, respectively, and are operatively connected therewith in the usual manner, so as to be independently operated thereby, through the control mechanisms 30 and 31 for the groups A and B, respectively. The truss or web 40 forms a bearing 43 in which the inner ends of the crankshafts 41 and 42 are independently journaled, as shown in Fig. 2 of the drawings. The outer ends of each of the crank shafts 41 and 42 are extended outwardly through and mounted at the opposite ends of the crank case 11, to provide the propeller shafts 44 and 45, respectively, upon which are fixed the propellers 20 to be revolved thereby, in the usual manner well understood in this art. Thus, the arrangement and mounting of the independent groups of cylinders A and B operatively connected with the separate crankshafts 41 and 42 and controlled by the control means 30 and 31, respectively, permits of independent operation of these groups and the shafts driven thereby, so that in effect the motor 10, while following conventional design and relative arrangement of crankshaft, crankcase, and cylinders of a single crankshaft motor, provides two independently operable units.

The power unit above described is particularly applicable to embodiment in the large high powered types and permits of absorbing the power of the motor by the two relatively small dimensioned propellers at opposite ends of the motor, with the several advantages and results referred to in connection with the form of the invention shown in Fig. 1 of the accompanying drawings. In the operation of the power unit of Fig. 2, the two groups or units A and B thereof are operated to rotate the crankshafts 41 and 42 in opposite directions with the result that the propellers 20, which are fixed on the extended opposite ends 44 and 45 of the separate crankshafts 41 and 42, respectively, are revolved in opposite directions to balance the propeller torque forces. The independent operation of groups A and B of the motor 10 is controlled through the medium of the control levers 32 and 33 operating the control means 30 and 31, respectively, for each group of cylinders A and B, so that the crank shafts and propellers can be independently operated and controlled as conditions may call forth.

If desired the motor 10 of the power unit of Fig. 2, can be provided with the housing 16 on the crank case to receive a propeller shaft 22 and gearing 23 and 24, as shown in the form of Fig. 1.

As hereinbefore explained, the principles and features of the invention are particularly adapted for embodiment in power units of the large high powered type for airplanes, in order to overcome certain enumerated disadvantages and to secure certain results and increased efficiency in such types. The invention is also applicable, as will be clear, to power units of relatively small low powered or other types, as well as to power units of lighter-than-air types of aircraft.

It is also evident that various changes, variations, substitutions and modifications might be resorted to without departing from the spirit and scope of my invention, and hence I do not wish to limit myself to the exact and specific disclosures hereof.

Desiring to protect my invention in the broadest manner legally possible, what I claim is:

1. In an aircraft power unit, a motor of the relatively large high powered type, and a pair of relatively small dimensioned minimum operating clearance propellers mounted at oposite ends of and carried by said motor and directly driven therefrom to absorb the power developed thereby, said propellers revolved in opposite directions by the motor to establish a balanced propeller torque.

2. In an aircraft power unit, a motor having a crankshaft formed in two independent sections extended at opposite ends of the motor to provide propeller shafts, a propeller mounted on each propeller shaft so formed, and the said crankshaft sections independently operated by said motor to revolve the propeller shafts and propellers in opposite directions.

3. In an aircraft power unit, a motor having cylinders, crankcase and a crankshaft driven thereby, the cylinders formed into two unit groups independently operable and controlled, and the crankshaft formed in two separate sections driven by said cylinder groups, respectively, to rotate in opposite directions, each of said independently driven crankshaft sections extended at one end of the motor to provide propeller shafts at opposite ends of said motor.

4. In an aircraft power unit, a motor having cylinders, crankcase and a crankshaft driven thereby, the cylinders formed into two longitudinally alined unit groups independently operable and controlled, the crankshaft formed in two separate longitudinally alined sections driven by said cylinder groups, respectively, to rotate in opposite directions, each of said independently driven crankshaft sections extended at one end of the motor to provide propeller shafts at opposite ends of said motor, and relatively small diameter propellers mounted on the extended ends of said shaft sections, respectively, to absorb the power developed by the motor.

5. In an aircraft power unit, a motor having cylinders, crankcase and a crankshaft driven thereby, the cylinders formed into longitudinally alined unit groups independently operable and controlled, the crankcase divided by a vertically disposed web thereacross between said cylinder groups, and the crankshaft formed in separate longitudinally alined sections driven by said cylinder groups, respectively, for rotation in opposite directions, the inner ends of said crankshaft sections journaled in said web within the crankcase and the opposite ends thereof extended to provide propeller operating shafts at opposite ends of the said motor.

6. In an aircraft power unit, a motor, a crankshaft for the motor formed in independent sections, and a propeller driven by each crankshaft section, respectively.

7. In an aircraft power unit, a motor, a crankshaft formed in axially alined independent sections, and a propeller driven by each crankshaft section, respectively.

8. In an aircraft power unit, a motor having the cylinders thereof formed in unit groups for independent operation and control, a crankshaft for operation by each cylinder group respectively, the said crankshafts in substantial axial alinement, and a propeller driven from each crankshaft, respectively.

9. In an aircraft power unit, an internal combustion motor having the cylinders thereof formed in unit groups for independent operation, independent control means for each unit group of cylinders, a separate crankshaft for each cylinder group, the said shafts in substantial axial alinement, and propellers driven by said crankshafts, respectively.

Signed at Ithaca, New York, this 27th day of June, 1924.

RANDOLPH F. HALL.